Figure 1:
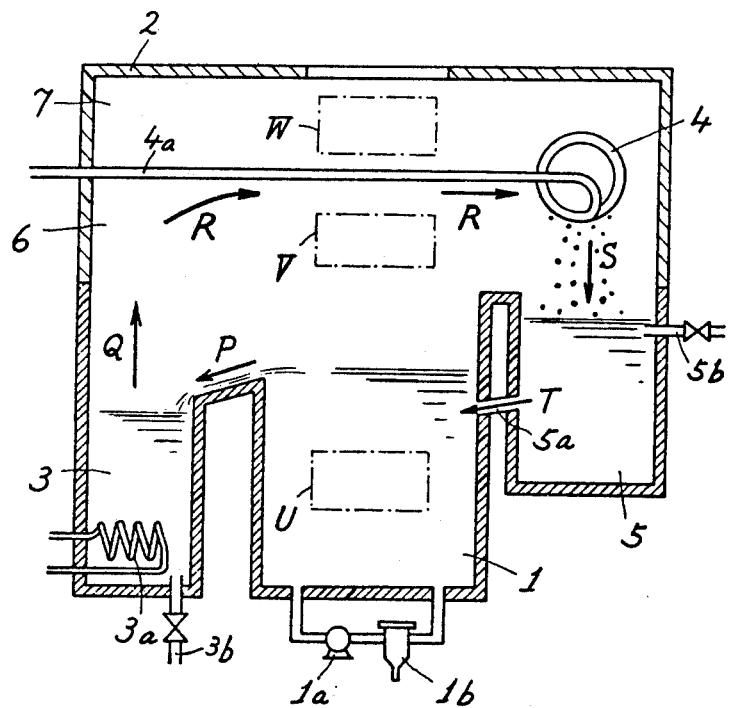

United States Patent [19]

Horimoto

[11] 4,218,914
[45] Aug. 26, 1980

[54] APPARATUS FOR TESTING AIR TIGHTNESS

[75] Inventor: Toshio Horimoto, Yamatokouriyama, Japan

[73] Assignee: Ohtsuka Giken Kogyo Kabushiki Kaisha, Osaka, Japan

[21] Appl. No.: 967,116

[22] Filed: Dec. 7, 1978

[30] Foreign Application Priority Data

Jul. 31, 1978 [JP] Japan ................................ 53/93781

[51] Int. Cl.² .................................................. G01M 3/06
[52] U.S. Cl. .................................................. 73/45.5
[58] Field of Search ................................ 73/45.5, 49.7

[56] References Cited

U.S. PATENT DOCUMENTS 3,646,804  3/1972  Myers ................................ 73/45.5

FOREIGN PATENT DOCUMENTS 502268  4/1976  U.S.S.R. ................................ 73/45.5

Primary Examiner—Donald Watkins
Assistant Examiner—Joseph W. Roskos
Attorney, Agent, or Firm—Browdy and Neimark

[57] ABSTRACT

An apparatus for testing leaks comprises a steeping bath, a boiling bath at one side of the steeping bath, a water separating bath at the other opposite side of the steeping bath and an overhead vapor bath covering those baths which has a cooling device for condensing a fluorocarbon vapor over the separating bath; the so-condensed liquid fluorocarbon drops into the steeping bath for testing an air tightness of sealed containers, boxes or the likes having an internal pressure, wherein the liquid fluorocarbon overflowing from the steeping bath into the boiling bath is boiled therein for circulation and purification of said liquid.

10 Claims, 1 Drawing Figure

APPARATUS FOR TESTING AIR TIGHTNESS

This invention relates to an apparatus for testing an air tightness of containers or the likes.

Containers such as carburetors of internal combustion engines have generally been put to the test of air tightness by methods in which water or gasoline (or other combustibles) contacts with the containers. For instance, the containers were charged with a water internal pressure and rates of the pressure were measured. In another method, containers were charged with an air internal pressure, then the containers were steeped in water, gasoline, thinner, kerosene or other combustibles to be put to visual inspection of bubbles.

There have been many serious problems in those usual methods. When the testing medium was water, it would take a long time to dry up the containers. If any amount of water would remain inside the containers, it would rust them.

On other hand, when the combustibles were used in the inspection, they would involve dangers of fire or explosion. Accordingly, it was difficult to renew the combustibles in steeping bath. The growing turbidity and intrinsic higher surface tension of the combustible liquid often made it difficult to find out a slight leakage of air or gas from the inside of the container.

An object of the present invention is to eliminate the various disadvantages and defects in testing air tightness of containers such as carburetors desired to be air tight.

Another object of this invention is to supply a novel apparatus by which an air tightness can be inspected with greater ease, safety, preciseness and efficiency.

The apparatus in this invention involves fluorocarbons as a testing medium and comprises a vapor bath and several liquid baths of which is formed a fluorocarbon circulation system. A steeping bath is interposed between a boiling bath and a water separating bath. Those three baths are covered with the vapor bath in which is set, above the separating bath, a proper cooling device such as a coiled tube through which is passed a cooling medium.

The steeping bath and the water separating bath are combined together with a return pipe or conduit. The conduit is spanned between a top portion of the steeping bath and a middle high portion of the separating bath. The boiling bath having a heating means therein is isolated with a lower partition from the steeping bath. The partition allows the fluorocarbons to overflow from the steeping bath into the boiling bath.

The fluorocarbons which may be used in the above-mentioned three liquid baths are selected from the following group;

1,1,2-trichloro-1,2,2-trifluoroethane, trichloro-monofluoromethane, and 1,1,2,2-tetrachloro-1,2-difluoroethane.

The boiling points of those fluorocarbons are respectively 47.6° C., 23.8° C. and 92.8° C. The melting points are respectively −35° C., −111° C. and +26° C. So the above first fluorocarbon is useful in most temperate regions or atmospheres, the second one is available in frigid zones or atmospheres and the third one is available in torrid zones or atmospheres.

In a stationary state of the apparatus under operation, the fluorocarbon vaporizes from the boiling bath and the increased amount of the vapor is condensed, together with a small amount of water vapor, to the liquid and water by the cooling device in the vapor bath. The condensed liquid and a small amount of water drip down together into the water separating bath to raise the liquid level thereof. The liquid fluorocarbon is then forced into the steeping bath through the return conduit by the head of liquid in the water separating bath. On the other hand, from the separated upper water layer in the separating bath, the increased amount of water is sometimes or continuously drained out.

The rise of the steeping bath causes the liquid in said bath to return to the above-mentioned boiling bath, and thus a continuous internal circulation of the fluorocarbon is formed and kept.

The present invention will be hereinafter more fully explained with reference to an embodiment shown by the accompanying figure.

IN THE DRAWING

FIG. 1 is a schematic cross sectional view of an embodiment.

In FIG. 1, at one side of a steeping bath 1 covered with a cover 2, a boiling bath 3 is located. A cooling coiled pipe 4 is supported aloft at the opposite side. Under the coil 4 a water separating bath 5 is located the bath 1 being connected to the bath 5 by a return conduit 5a.

The numeral 3a indicates a coiled pipe to pass a heating medium, the numeral 4a indicates a conduit for a cooling medium and the numeral 5b shows a water drain pipe.

In order to operate the apparatus, foregoing three liquid baths 1,3 and 5 are filled with a selected fluorocarbon, the heating medium such as compressed water vapor is supplied through the pipe 3a, and the cooling medium such as cold water is supplied to the coiled pipe 4. The fluorocarbon will violently volatilize and the vapor will spread over the three liquid bath to contact with the cooling coiled pipe and condense thereby. The condensed liquid fluorocarbon drips down into the water separating bath 5. Consequently, an increased amount of said liquid flows into the steeping bath through the return conduit 5a, causing in turn the amount to overflow in the arrowed direction P into the boiling bath. A stationary circulation of the substance in the arrowed directions P,Q,R,S and T is thus formed inside the apparatus.

The vapor current shown by the arrow R is naturally brought about by higher densities of the fluorocarbons. Namely, the densities are from 7.4 grams per liter to 5.9 grams per liter corresponding to 6.5–5.2 times that of the air density. The condensation of the fluorocarbon vapor near to the cooling coil makes lower the apparent density of mixed gas thereabout, and a heavier mixed gas above the boiling bath will sink aslant downwards and rightward.

As the result of the phenomena described above, a vapor bath 6, the chief ingredient of which is the fluorocarbon gas, will be formed in the lower portion of a space between the cover and the all liquid baths. An air bath 7 will also be formed above said vapor bath.

After the apparatus reaches the above stationary running condition, a container U having an internal air pressure (shown with dot-and-dash line) will be placed into the steeping bath 1 and its bubbling checked through a spy glass (not shown) of the side wall. The cold container will then be lifted up to the position V in the hot vapor bath 6.

The container, accordingly, will be pre-heated there and be washed with a condensing fluorocarbon. The container will be lifted again to the position W in the air bath 7, and there, dried rapidly and spontaneously.

As described above, in the apparatus for air tightness test, a kind of distillation system is given in which the fluorocarbon circulates while being purified by the repeated volatilization and condensation.

The containers such as carburetors will usually bring oils and debris, such as rust, into the system and this tends to decrease a transparency of the liquid. However, the transparency is maintained because of the continuous renewing of the liquid in the steeping bath 1 by the overflow to the boiling bath 3 and by the return from the water separating bath 5. On the other hand, a considerable amount of water vapor in the air bath will be condensed by the cooling coil and come into the separating bath. The mingled water will float on the liquid fluorocarbon by the difference of densities and the mutual insolubility. So, the floating water can be discharged through the water drain pipe 5b.

Machine oils and the like accumulated in the boiling bath are also discharged together with fluorocarbon through a pipe 3b on demand at any time. In this case, a comparable amount of fresh fluorocarbon is to be supplied to the system.

Insoluble rigid impurities such as iron powder, rusts and dusts are similarly eliminated by a filter 1b to which the liquid in the steeping bath 1 is fed by a pump 1a.

It will be understood that the apparatus in this invention has an advantageous structure for air tightness test which utilize the inflammability and high vapor densities of the fluorocarbons. It is much easier to operate the apparatus, and there is no danger of fire or explosion in said operation.

Moreover, the testing can be performed with much higher correctness and higher speed due to the excellent transparency of the steeping bath liquor.

The apparatus in accordance with the invention has been typically exemplified hereinabove, however, it is a matter of course that the apparatus and the systems accompanying thereto can be constructed in other various modified ways within the spirit and the scope of the invention. For example, some azeotropic mixtures of one of the fluorocarbons and a lower alcohol such as isopropylalcohol are available also without any danger of ignition. Instead of lifting and taking down the objects of the test, the apparatus itself can be vertically reciprocated.

In the event that the apparatus were installed in an essentially windless atmosphere, the cover 2 could be eliminated. The vapor of the fluorocarbons from the steeping bath 3 would circulate in the same manner as explained hereinbefore.

Further, it is to be noted that the coiled pipe 4 can be substituted with any other known cooling devices one of which may comprise a set of heat exchanging plates or the likes. The coiled pipe 3a can be substituted with any other known heating means, for instance, an electric heater covered with a protecting tube.

What is claimed is:

1. An apparatus for air tightness testing comprising a steeping bath 1 positioned at a central position of the apparatus, a boiling bath 3 which has a heating means and is positioned along by the steeping bath at one side thereof, a cooling device 4 supported in the air at the other side of the steeping bath and a water separating bath 5 positioned under the cooling device; wherein a liquid fluorocarbon selected from the group consisting of
   1,1,2-trichloro-1,2,2-trifluoroethane,
   trichloro-monofluoromethane, and
   1,1,2,2-tetrachloro-1,2-difluoroethane, and which is overflowing from the steeping bath into the boiling bath, is boiled therein by the heating means to volatilize spreading over said three liquid baths, the fluorocarbon vapor is condensed to liquid by the cooling device to drip into the water separating bath and therefrom only the fluorocarbon is returned to the steeping bath being separated from an incidentally condensed water, and thereby a vapor bath 6 is stationary formed over said three liquid baths.

2. An apparatus for air tightness testing in accordance with claim 1, wherein the heating means comprises a coiled pipe through which a heating medium is passed.

3. An apparatus for air tightness testing in accordance with claim 1, wherein the heating means comprises an electric heater covered with a protecting tube.

4. An apparatus for air tightness testing in accordance with claim 2 or 3, wherein the cooling device comprises a coiled pipe through which a cooling medium is passed.

5. An apparatus for air tightness testing in accordance with claim 2 or 3, wherein the cooling device comprises a set of heat exchanging plates through which a cooling medium is passed.

6. An apparatus for air tightness testing in accordance with claim 1, wherein the steeping bath, the boiling bath, the water separating bath and the cooling device are covered with a cover 2 supported overhead.

7. An apparatus for air tightness testing in accordance with claim 1, wherein the fluorocarbon is mixed with a lower alcohol to form an azeotropic mixture.

8. An apparatus for air tightness testing in accordance with claim 7, wherein the lower alcohol is isopropylalcohol.

9. An apparatus for air tightness testing comprising a centrally disposed steeping bath, containing a fluorocarbon liquid having a density greater than water; a boiling bath containing said fluorocarbon and disposed adjacent one side of said steeping bath, said boiling bath containing means to heat the fluorocarbon therein to effect boiling of said fluorocarbon; a water separation bath lying adjacent a second side of said steeping bath, said water separation bath containing said liquid fluorocarbon;
   a cooling device supported above said water separation bath; means to pass fluorocarbon liquid from said steeping bath to said boiling bath; means to pass liquid fluorocarbon from approximately the mid-height of said water separation bath to said steeping bath; and means to dispose a product to be tested within said apparatus so that the article to be tested is disposed beneath the surface of said fluorocarbon in said steeping bath so that the presence of bubbles will illustrate the absence of air tightness, then the article is raised above the liquid level of the steeping bath so as to be preheated by hot fluorocarbon vapor leaving said boiling bath, and then the article is raised to a higher position so as to become air dried.

10. A method of using the apparatus of claim 9 to test an article for air tightness, comprising depositing an article in said steeping bath, inspecting said steeping bath to determine the presence or absence of air bubbles, lifting the article above the fluorocarbon level in the steeping bath and there heating said article, and then lifting said article to a higher level and effecting air drying of said article.

* * * * *